United States Patent [19]

Connelly

[11] Patent Number: 4,632,508
[45] Date of Patent: Dec. 30, 1986

[54] WINDSCREEN DEVIATION CORRECTING PILOT DISPLAY

[75] Inventor: John J. Connelly, Northpoint, N.Y.

[73] Assignee: Grumman Aerospace Corporation, Bethpage, N.Y.

[21] Appl. No.: 636,760

[22] Filed: Aug. 1, 1984

[51] Int. Cl.$^4$ .................. G02B 5/32; G02B 27/10
[52] U.S. Cl. ........................... 350/174; 350/3.7; 358/103; 340/705; 340/724
[58] Field of Search ............. 350/162.23, 3.7, 174; 358/103, 104, 250; 140/705, 724

[56] References Cited

U.S. PATENT DOCUMENTS

| | | | |
|---|---|---|---|
| 3,059,519 | 10/1962 | Stanton | 88/1 |
| 3,230,819 | 6/1966 | Noxon | 88/1 |
| 3,603,667 | 9/1971 | Freeman | 350/103 |
| 3,614,314 | 10/1971 | Rossire | 178/7.88 |
| 3,666,887 | 5/1972 | Freeman | 178/7.85 |
| 3,680,946 | 8/1972 | Bellows | 350/174 |
| 3,686,626 | 8/1972 | Bateman et al. | 340/27 NA |
| 3,932,861 | 1/1976 | Bull | 340/324 AD |
| 4,028,725 | 6/1977 | Lewis | 358/103 |
| 4,048,653 | 9/1977 | Spooner | 358/104 |
| 4,127,850 | 11/1978 | Vallins | 340/324 A |
| 4,167,113 | 9/1979 | Mann | 350/174 |
| 4,305,057 | 12/1981 | Rolston | 340/27 NA |
| 4,340,878 | 7/1982 | Spooner et al. | 340/27 R |
| 4,347,507 | 8/1982 | Spooner | 340/705 |
| 4,347,508 | 8/1982 | Spooner | 340/705 |

OTHER PUBLICATIONS

Lewis, "A High Resolution Vision System for Aircraft and Trainers," Proceedings of the IEEE 1976 National Aerospace and Electronics Conference, Dayton, Ohio, May 18, 1976.
Walker, "Helmet Mounted Display System for Attack Helicopters," Displays, Oct. 1980, vol. 2, No. 3, p. 129.
Stephenson, "A Helmet-Mounted Sight System for Fighter Aircraft," GEC Journal of Science & Technology, vol. 46, No. 1, (1980), p. 33.

Primary Examiner—Jon W. Henry
Attorney, Agent, or Firm—Pollock, VandeSande & Priddy

[57] ABSTRACT

Two separate CRT image generators are symmetrically positioned with respect to the center line of a cockpit. A first generator projects a virtual image of reticle and symbol information to a pilot's left eye while the second image generator projects a virtual image of symbol information relating the right eye, the images being contiguous and aligned but without disturbing overlap or gap. As a result, a pilot sees an object outside the windscreen in parallax-free accurate superposition with symbols projected by the first and second generators.

1 Claim, 9 Drawing Figures

WINDSCREEN DEVIATION CORRECTING PILOT DISPLAY

FIELD OF THE INVENTION

The present invention relates to pilot head up displays, and more particularly to a virtual image display which greatly improves upon symbol position error due to windscreen angular deviation.

BACKGROUND OF THE INVENTION

In conventional fighter aircraft head up displays are made available to the pilot so that target and navigational data and symbols produced on a CRT may be projected onto an optical element in front of him. As a result, the data and symbols become visually superimposed with objects appearing outside the windscreen and in a single field of view.

The prior art is exemplified by U.S. Pat. No. 3,230,819 issued Jan. 25, 1966, to Noxon. FIG. 1 herein schematically illustrates the invention disclosed in Noxon wherein there is provided a combining mirror having image-producing capabilities. The mirror may be fabricated from a thin, partially silvered or dichroic parabolic mirror to which the pilot views the outside world by transmitted rays. The combining mirror collimates the image from a CRT-projected display, the virtual image theoretically located at infinity. Therefore, the rays to each of the pilot's eyes are made parallel FIG. 2 herein illustrates a second figure from the Noxon patent wherein the prior art system is arranged in an aircraft with the dichroic parabolic mirror positioned adjacent the windscreen and with the CRT and a lens image projector positioned immediately beside the head of the pilot. In operation, the pilot views the combining mirror and sees the navigational data and symbols (which appear on the CRT) superimposed with actual targets or other objects in his line of sight.

Although the advantages of head up displays are well recognized, a primary disadvantage of them is the introduction of parallax problems due to windscreen angular deviation of light rays from objects outside the windscreen. These problems are referred to in the literature as vergence, dipvergence, divergence, disparity, etc.

When an object is viewed by a pilot through a curved windscreen, the lines of sight from the object to the eyes of the pilot strike the windscreen at different angles of incidence and emerge nonparallel. Using a present art head up display with both eyes of the pilot at the exit pupil (or exit window), the pilot sees an object outside the windscreen at a different angular position with each eye but sees parallel or collimated symbols or reticle from a head up display that he may be required to superimpose on the object at essentially the same position with each eye. As a result, the pilot cannot avoid seeing one object and two reticles or two objects and one reticle depending on his diplopia threshold and on which set his eye-brain visual system selects.

To appreciate how this occurs, reference is made to FIG. 3 wherein a curved windscreen 10 is shown. Informational symbols relating to navigation, weapon control, etc., are projected from a CRT 12 or other visual display to an optical combining mirror 14 or "combiner." The pilot's left eye will see the reflected rays 16 from CRT 12 while his right eye sees reflected rays 18. In order to perfect superposition of the reflected CRT symbols on an object outside the windscreen, image rays 24 and 26 from an external object should pass through the windscreen and remain parallel. However, as indicated by the transmitted rays 28 and 30, this does not occur due to the different angles of incidence at windscreen points 20 and 22. A parallax condition results and the left eye of the pilot does not see the same superimposed images as his right eye. If, for example, the CRT were to generate a simple ring reticle and if the outside world presented a target to the pilot, his left and right eye images would be as shown in FIG. 4A. His brain interprets what he is seeing as either condition shown in FIG. 4B. This obviously presents serious problems to a high-speed aircraft pilot and the problem becomes exacerbated as more sleek windscreens are developed in aircraft locating the pilot farther back from a relatively thick windscreen. Decollimation of the head up display cannot be used as a solution for this problem.

BRIEF DESCRIPTION OF THE PRESENT INVENTION

The purpose of this invention is provide an aircraft pilot with the virtual image display that can be made free of symbol position error and pilot discomfort that is always present and uncorrectable when a head up display is used in an aircraft equipped with a curved windscreen. The invention also provides an instant and a total field of view that are essentially twice as large as present head up displays. The invention provides full head up display symbology except that the left and right halves of the display are generated separately and presented to the pilot's left and right eyes, by the left and right optical systems, respectively. This new method of generating a virtual image display eliminates vergence and double vision problems and provides a solution to the problem of achieving accurate symbol positioning relative to objects the pilot sees outside the cockpit through the highly curved windscreens favored for use on modern aircraft. In addition, the invention increases the fields of view by the use of a unique collimating lens attached to the aircraft canopy structure. This is a substantial advantage since head up displays utilized on modern aircraft place a smaller combiner over the instrument panel.

A further object of the invention is the use of two image projectors, such as CRTs for providing twice as many displayed pixels avoiding a display resolution reduction as the field of view is doubled. The enlarged field of view can be made to cover areas of the aircraft presently occupied by instrument panels. Virtual images may be generated to display to the pilot the data presently displayed on head up displays, multifunction displays, attitude director indicators, engine instruments, altimeters, air speed indicators, etc., resulting in a substantial decrease in weight and cost and permitting aircraft designers to reduce the size of the instrument panel and increases visibility out of an aircraft cockpit.

In this invention, by presenting symbology in one eye only, the eyes of the pilot may converge or diverge to see an object outside the windscreen but only one object and one reticle will be seen. Furthermore, by mapping the angular deviation to the lines of sight for objects outside the cockpit in a matrix of azimuth and elevation angles, as seen by the one eye that has the reticles presented to it in the cockpit, a correction factor can be calculated for each position where the symbol or reticle is to be presented. Therefore, by applying the factor calculated for the deviation of the windscreen as seen by the left eye, for example, and applying it appropriately to the symbol or reticle position that appears only on the left side of the vehicle to the left eye, the single image of the outside object and symbol is obtained correctly overlayed. The same applies to the right side since the system is symmetrical about the aircraft center vertical plane.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE PRESENT INVENTION

Figure 1:
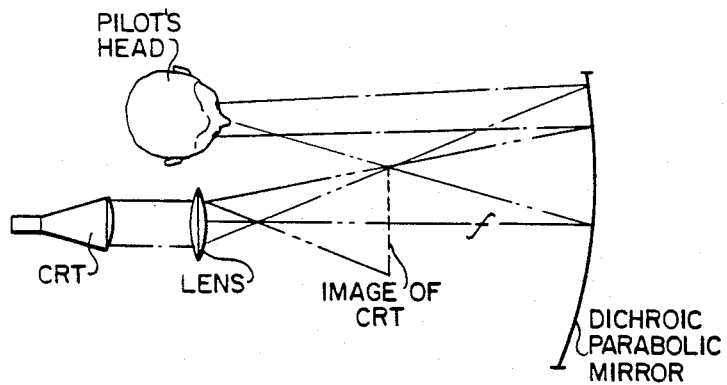
FIG. 1 is a schematic illustration of the optics employed in a prior art head up display.
Figure 2:
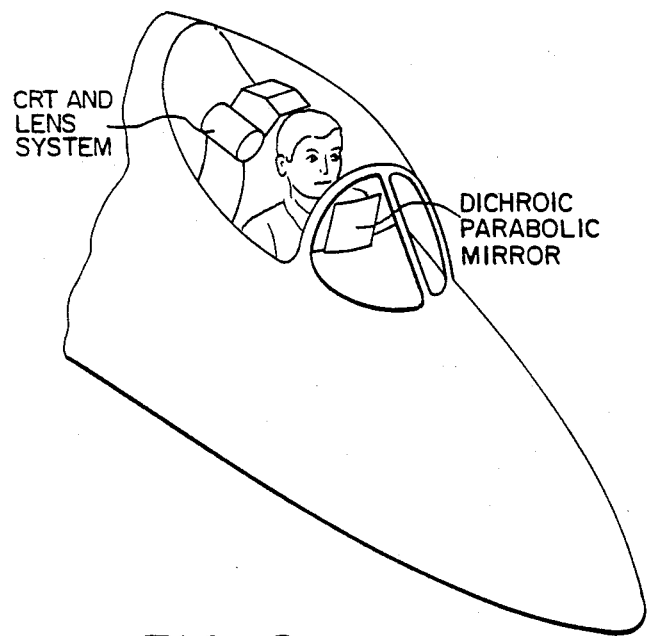
FIG. 2 is a pictorial diagram of the location of the optic elements of FIG. 1 within an aircraft cockpit.
Figure 3:
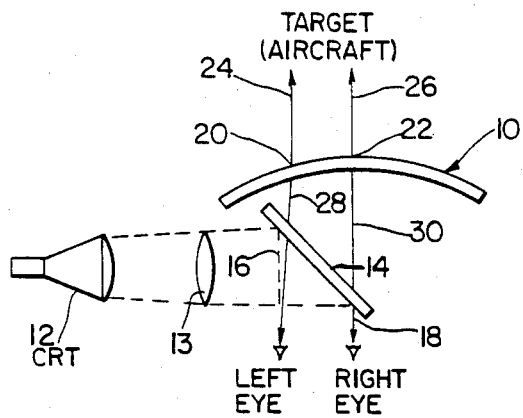
FIG. 3 is a schematic illustration of the effect of parallax caused by curved aircraft windscreens.
Figure 4A:
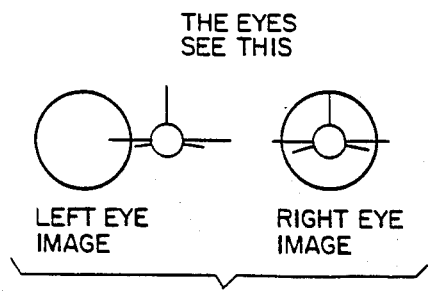
FIG. 4A is an illustration of the images perceived by a pilot in each of his eyes as a result of the parallax condition illustrated in FIG. 3.
Figure 4B:
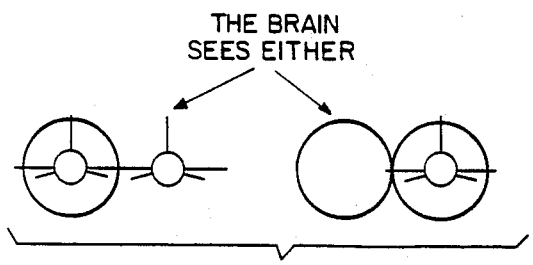
FIG. 4B is an illustration of alternate confusing images the brain perceives as a result of the parallax condition illustrated in FIG. 3.
Figure 5:
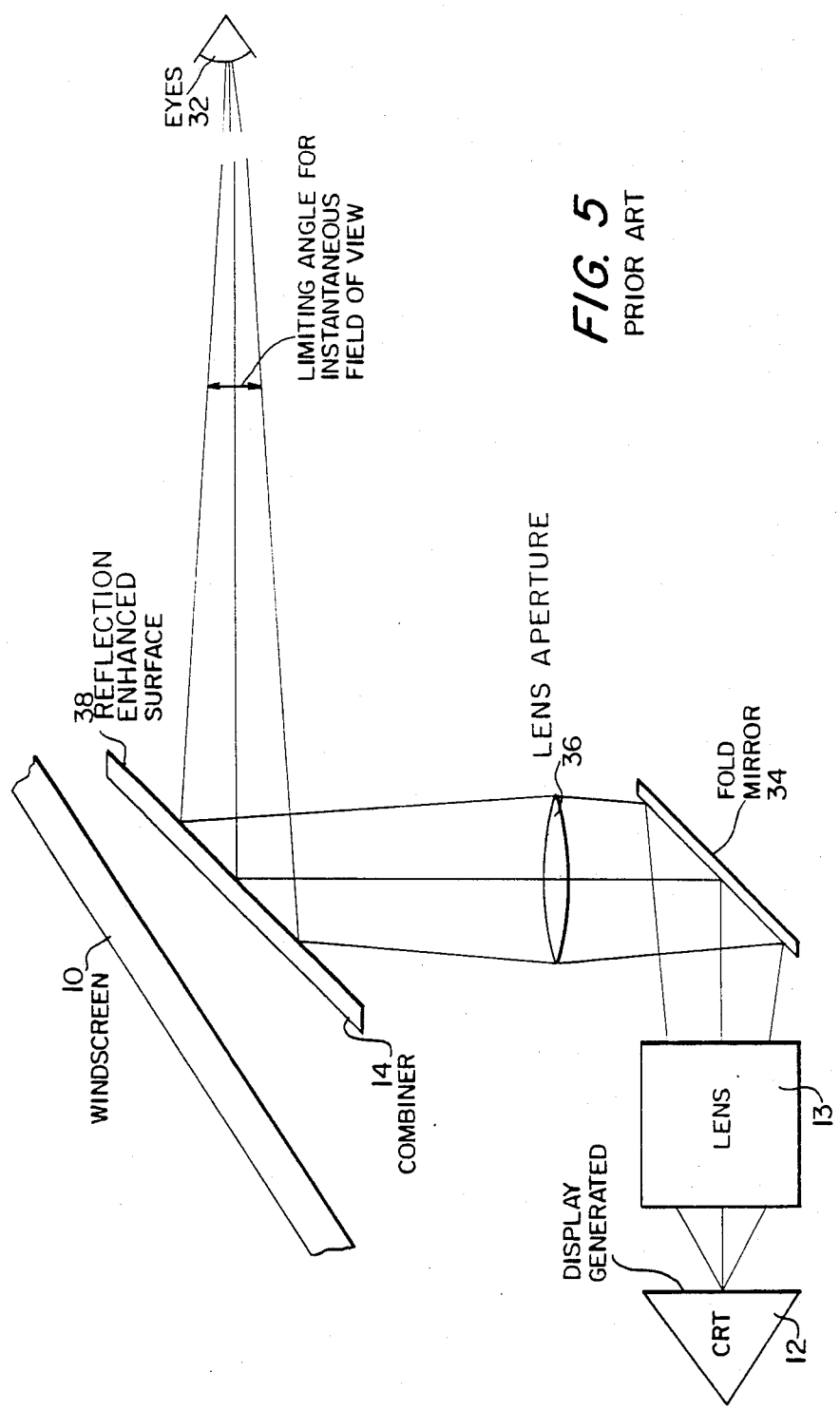
FIG. 5 is a schematic representation of conventional head up display optics.

The following discussion referencing FIG. 5 serves as an introduction of conventional head up display optics. A display, such as reticle and instrument data is produced on the face of a CRT 12 and collimated by lens 13. The fold mirror 34 redirects the display beams to lens aperture 36. The size of the lens aperture limits the instant field of view. The reflection enhanced surface 38 reflects the collimated image from lens aperture 36 toward each eye 32 of the pilot. The reflected image will be visually superimposed on the object seen by the pilot and appearing outside the windscreen. For the reasons previously set forth, any target or object seen through a windscreen characterized by a thickness and a curvature will undergo distortion and this will cause difficulty for the pilot. The lens aperture 36 limits the reflected image of the generated display so that a limiting angle for instantaneous field of view is as indicated.

Figure 6:
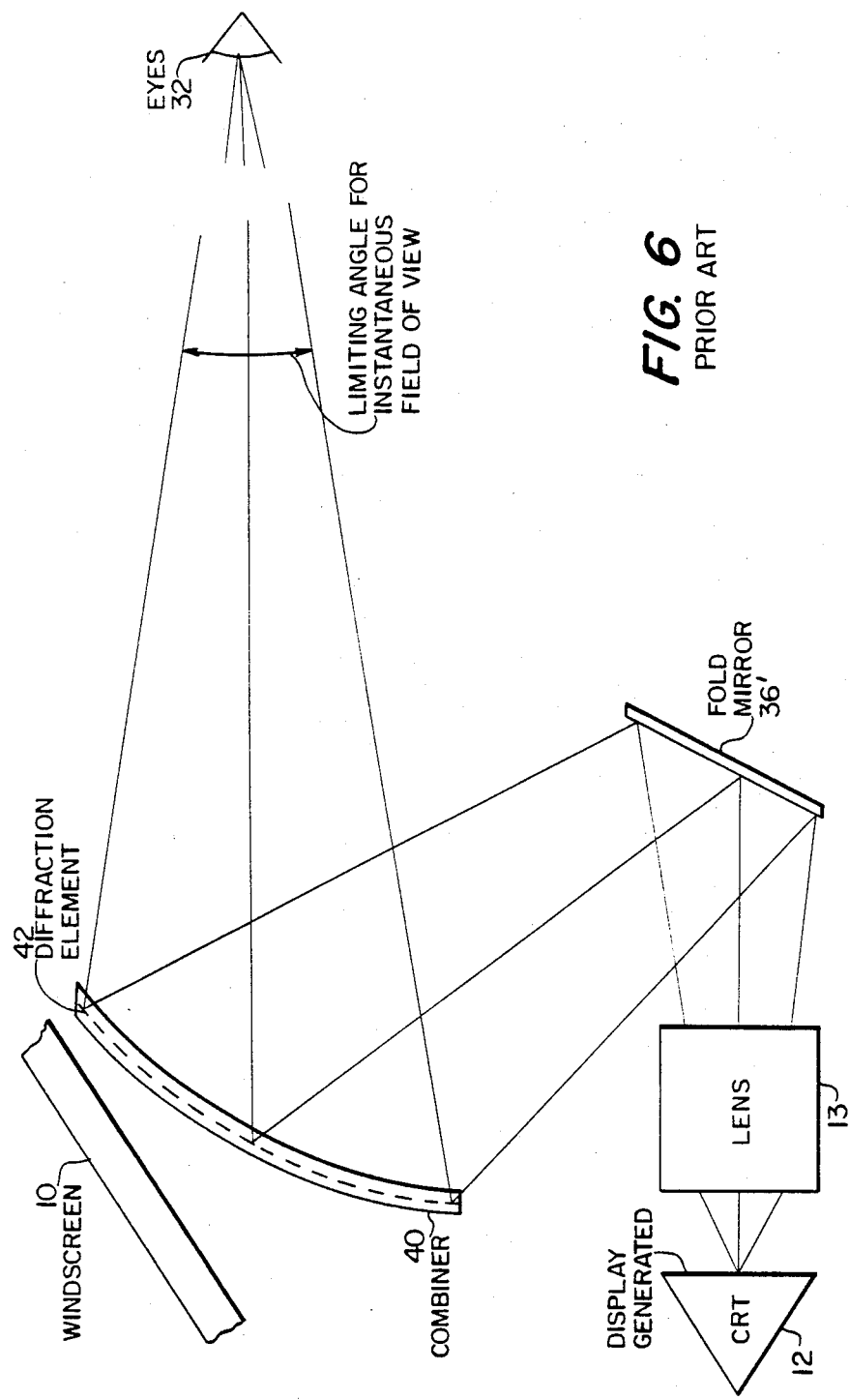
FIG. 6 is a diagrammatic illustration of an improved head up display utilizing diffraction collimating optics.

An enlarged instantaneous field of view may be realized in conventional head up displays by moving the lens aperture 36 and in its stead employing a combiner which serves as a lens as in FIG. 6. In this configuration the lens 13 forms a real image of the CRT 12 which is redirected by the fold mirror 36' to a combiner 40 which replaces the reflection enhanced surface 38 of combiner 14 (FIG. 5) with a diffraction coating or encapsulated element 42. The combiner 40 with an appropriate combination of shape and encapsulated coating acts as an efficient reflector and as the collimating lens. As will be seen from FIG. 6, the instantaneous field of view is no longer limited by a collimating lens such a 36 in FIG. 5 and thereby offers the larger limiting angle for instantaneous field of view. However, the effect of parallax due to curvature of the windscreen is not avoided by the prior art approach of FIG. 6.

Figure 7:
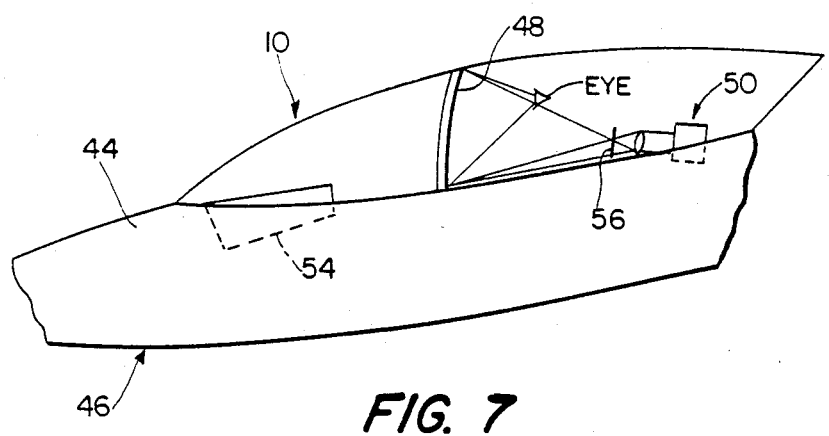
FIG. 7 is a partial side elevational view of the optical components comprising the present invention.
Figure 8:
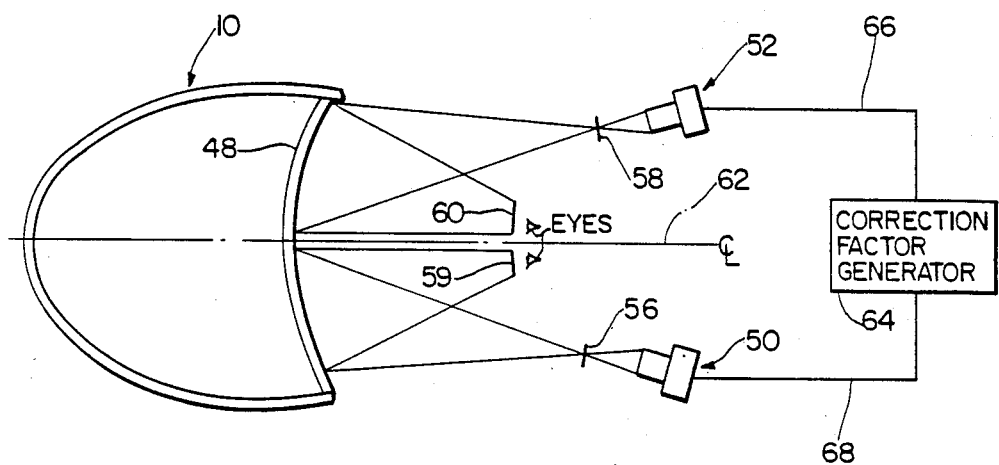
FIG. 8 is a top plan illustration of the optics employed in the present invention.

The windscreen compensating display of the present invention is illustrated in FIGS. 7 and 8. The figures show the windscreen portion of an aircraft wherein windscreen 10 is shown closed over a corresponding fuselage section 44 of an aircraft, generally indicated by reference numeral 46. Between the forward end of the windscreen and the head of a pilot is a combining element 48 which may be fabricated from glass or plastic and may be a flat or curved plate.

In the event the screen is flat, it is equipped with a diffraction coating or diffraction element embedded therein such diffraction element 42 as previously explained in connection with FIG. 6. The diffraction element or coating serves as a reflector and a lens to collimate reflections therefrom as produced by an image generator 50, the latter typically taking the form of a CRT and lens as shown by components 12 and 13 in FIG. 6. The diffraction coating employed provides very efficient selective reflection and shapes the reflected wave fronts in the same manner as an element which is a portion of a sphere, ellipsoid or other shape as desired. If a curved combiner is used, it has the desired shape of the reflecting surface with a highly efficient diffractive coating on that surface that is designed to selectively enhance reflection only. The actual construction of such combiners is well known in the prior art. However, an improvement of the present invention is the attachment of the combiner 48 to a transverse periphery of the windscreen, rather than at the conventional location only immediately above an instrument panel 54 located in the cockpit. Due to the location of the combiner as shown in FIGS. 7 and 8, there is an increase in the instant field of view available to the pilot by a factor of two as compared with conventional systems.

In order to avoid the visual confusion of prior art head up displays, the present invention utilizes two symmetrically positioned CRT image generators 50 and 52. The images from image generators 50 and 52 are correspondingly indicated by reference numerals 56 and 58. The symbology or video comprising the images is, of course, superimposed along with the pilot's forward view of the real world on combiner 48. Each image 56, 58 is placed at or near the focal plane of the combiner 48. Each of the images is then collimated by the combiner to appear to be at a sufficient distance ahead of the aircraft to be seen by the pilot, together with objects outside the cockpit, without eye accommodation. The combiner 48 images a stop in each of the image generators 50, 52 forming corresponding eye boxes 59, 60. Each of these eye boxes represents a location from which the entire field of view is visible. A unique aspect of the present invention is the location and size of the eye boxes 59 and 60. Each one is located to one side of the aircraft center line 62 where it serves to provide display symbology to only one eye of the pilot. Thus, eye box 60 displays symbology only to the right eye of a pilot while eye box 59 displays symbology only to the left eye of a pilot. The fields of view provided by image generators 50 and 52 are designed to be immediately adjacent to one another without gap or overlap. Thus, the information seen by the left eye of a pilot will be contiguous with, but independent from, the information seen by the other eye of the pilot. For example, if gauge data is to be displayed, those data from the instrument panel to the left of the cockpit center line will be displayed only by image generator 50 and, consequently, only seen by the left eye. Conversely, instrument displays ordinarily associated with the right side of the instrument panel will be generated only by image generator 52 and seen only by the right eye of the pilot.

While the fields of view are shown to be contiguous with adjoining "eye boxes" in FIG. 8, the invention is not limited to this condition. The projector 52 may be designed to service the left side of the pilot's field of view and/or the "eye boxes" may overlap to some degree as appropriate to provide the pilot with correct and comfortable viewing. It still prevents symbology from being seen by both eyes. Thus, the present display system is capable of displaying symbology in the correct location relative to objects outside the curved windscreen, which cannot be accomplished by available head up displays.

In the present invention, a reticle or symbol is presented in only one eye of the pilot, thereby permitting the eyes of the pilot to converge or diverge to see an object outside the windscreen yet avoid the perception of two reticles as discussed in connection with the prior art. Furthermore, by mapping the angular deviation to the line of sight for objects located in a matrix of azimuth and elevation angles, as seen by the one eye that has the reticles presented to it in the cockpit, a correction factor can be calculated for each position where the symbol or reticle is to be presented. Therefore, by applying the factor calculated for the deviation of the windscreen as seen by the left eye, for example, and applying it appropriately to the symbol or reticle position that appears only on the left side of the aircraft to the left eye, the single image of the outside object and the symbol is obtained in the correct location. The same applies to the right side since the system is symmetrical about the aircraft center vertical plane The factors may be stored in a correction factor generator or display generator 64 having respective outputs 66, 68 connected to corresponding image generating CRTs 52, 50. The generator may be a microprocessor programmed with a look-up table in a manner well known in the art.

Using the two image generators 50, 52, there are provided twice as many display pixels avoiding a display resolution reduction as the field of view is doubled. The enlarged field of view can be made to cover areas of the aircraft presently occupied by instrument panels.

Virtual images may be generated to display to the pilot data presently displayed by head up displays, multifunction displays, attitude director indicators, engine instruments, altimeters, air speed indicators, etc., thereby resulting in a substantial decrease in weight and cost and permitting aircraft designers to reduce the size of an instrument panel and to increase visibility out of an aircraft cockpit.

The image generators 50 and 52 may be located on the canopy structure of an aircraft with the combiner, on the seat of the pilot or on the aircraft structure as required. It should also be noted that the present invention may be utilized for flight simulators as well as actual aircraft.

It should be understood that the invention is not limited to the exact details of construction shown and described herein for obvious modifications will occur to persons skilled in the art.

I claim:

1. A virtual image display for an aircraft having a windscreen characterized by a symmetrically oriented center line, the display comprising:

a light transmissive optical combining element laterally positioned across the windscreen and attached thereto, the combining element being a straight plate including diffraction means serving as a reflecting lens for collimating rays of light impinging thereon;

first image generating means located within the cockpit of the aircraft for projecting a virtual image of preselected symbols on the right side of the combining element, with respect to the centerline;

second image generating means located within the cockpit of the aircraft for projecting a virtual image of separate preselected symbols on the left side of the combining element, with respect to the centerline, the right and left virtual images being contiguous;

a pilot's head being locatable in a space where the field of view of each eye through the combining element including the superposition of an observed object appearing outside the windscreen and the virtual image appearing on the same side of the centerline as that eye thereby avoiding either of the pilot's eyes from seeing the virtual image appearing on an opposite side of the centerline.

* * * * *